US009469810B2

(12) United States Patent
Nakata et al.

(10) Patent No.: US 9,469,810 B2
(45) Date of Patent: *Oct. 18, 2016

(54) POLYMERIZABLE LIQUID CRYSTAL COMPOSITION AND THIN FILM USING SAME

(71) Applicant: DIC CORPORATION, Tokyo (JP)

(72) Inventors: Hidetoshi Nakata, Kita-adachi-gun (JP); Yasuhiro Kuwana, Kita-adachi-gun (JP); Hiroshi Hasebe, Kita-adachi-gun (JP); Kunihiko Kotani, Kita-adachi-gun (JP); Isa Nishiyama, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 14/348,765

(22) PCT Filed: Nov. 21, 2012

(86) PCT No.: PCT/JP2012/080174
§ 371 (c)(1),
(2) Date: Mar. 31, 2014

(87) PCT Pub. No.: WO2013/080855
PCT Pub. Date: Jun. 6, 2013

(65) Prior Publication Data
US 2014/0256896 A1 Sep. 11, 2014

(30) Foreign Application Priority Data
Nov. 30, 2011 (JP) ................................ 2011-261859

(51) Int. Cl.
| | |
|---|---|
| C09K 19/20 | (2006.01) |
| C09K 19/32 | (2006.01) |
| C09K 19/38 | (2006.01) |
| C09K 19/54 | (2006.01) |
| G02B 5/30 | (2006.01) |
| C09K 19/52 | (2006.01) |
| C09K 19/58 | (2006.01) |
| C09K 19/04 | (2006.01) |
| C09K 19/30 | (2006.01) |
| C09K 19/34 | (2006.01) |

(52) U.S. Cl.
CPC ......... *C09K 19/3852* (2013.01); *C09K 19/322* (2013.01); *C09K 19/3861* (2013.01); *G02B 5/3016* (2013.01); *C09K 19/54* (2013.01); *C09K 19/586* (2013.01); *C09K 2019/0448* (2013.01); *C09K 2019/2078* (2013.01); *C09K 2019/2092* (2013.01); *C09K 2019/3083* (2013.01); *C09K 2019/323* (2013.01); *C09K 2019/3408* (2013.01); *C09K 2019/3433* (2013.01); *C09K 2019/528* (2013.01); *C09K 2219/03* (2013.01)

(58) Field of Classification Search
CPC .......... C09K 19/3852; C09K 19/3861; C09K 19/586; C09K 2019/0448; C09K 2019/2078; C09K 2019/2092; C09K 2019/528; C09K 2219/03; C09K 19/322
See application file for complete search history.

(56) References Cited

U.S. PATENT DOCUMENTS

| | | | |
|---|---|---|---|
| 9,080,100 B2 * | 7/2015 | Hirai | C09K 19/3809 |
| 9,120,883 B2 * | 9/2015 | Kusumoto | C09K 19/2007 |
| 2010/0090163 A1 | 4/2010 | Irisawa et al. | |
| 2010/0143612 A1 | 6/2010 | Hirai | |
| 2014/0080990 A1 * | 3/2014 | Kusumoto | C09K 19/2007 526/313 |
| 2014/0183410 A1 * | 7/2014 | Uemura | G02B 1/105 252/299.64 |

FOREIGN PATENT DOCUMENTS

| | | |
|---|---|---|
| JP | 6-281814 A | 10/1994 |
| JP | 2007-332270 A | 12/2007 |
| JP | 2008-88291 A | 4/2008 |
| JP | 2008-517077 A | 5/2008 |
| JP | 2008-195762 A | 8/2008 |
| JP | 2008-250108 A | 10/2008 |
| JP | 2010-152217 A | 7/2010 |
| JP | 2010-248467 A | 11/2010 |
| JP | 2013-1834 A | 1/2013 |
| WO | 2006/039980 A1 | 4/2006 |

OTHER PUBLICATIONS

English translation of JP 2008-88291 provided by J-Platpat.*

(Continued)

*Primary Examiner* — Shean C Wu
(74) *Attorney, Agent, or Firm* — Westerman, Hattori, Daniels & Adrian, LLP

(57) ABSTRACT

The present invention relates to a polymerizable composition useful as a liquid crystal device, a display, an optical member, a coloring agent, a security marking, and a laser light emitting member and a thin film obtained from the polymerizable composition.

The present invention provides a polymerizable liquid crystal composition having excellent solubility into a solvent, exhibiting good adhesion to a base material, and being capable of realizing a thin film having low haze and no variations and, in addition, provides a thin film having excellent appearance by using the polymerizable liquid crystal composition.

The polymerizable liquid crystal composition according to the present invention is used and, thereby, a composition and a thin film having low haze and no variations and, at the same time, having excellent adhesion to a base material can be obtained at a low cost.

8 Claims, No Drawings

(56) References Cited

OTHER PUBLICATIONS

International Search Report dated Feb. 5, 2013 issued in corresponding application No. PCT/JP2012/080174.

The International Search Report and the Written Opinion of the International Searching Authority, or Declaration (Form PCT/ISA/220) issued in counterpart International Application No. PCT/JP2012/080174 dated Feb. 5, 2013, with Forms PCT/ISA/210 and PCT/ISA/237 (10 pages).

* cited by examiner

POLYMERIZABLE LIQUID CRYSTAL COMPOSITION AND THIN FILM USING SAME

TECHNICAL FIELD

The present invention relates to a polymerizable composition useful as a liquid crystal device, a display, an optical member, a coloring agent, a security marking, and a laser light emitting member and a thin film obtained from the polymerizable composition.

BACKGROUND ART

In recent years, polarizing plates, phase difference plates, and the like have been actively developed using polymerizable liquid crystal materials. They are obtained by coating a base material subjected to a rubbing treatment with a solution containing a polymerizable liquid crystal material, drying a solvent and, thereafter, causing polymerization by ultraviolet rays or heat. Meanwhile, it is also known that, when a polymerizable cholesteric liquid crystal material is prepared by adding a chiral compound to a polymerizable liquid crystal material, a circularly polarized light separation element is obtained in the same manner and, for example, applications to brightness enhancement films and the like have been studied.

Various thin films produced by polymerizing these polymerizable liquid crystal materials are required to have an appropriate phase difference and the uniformity thereof and, furthermore, low haze, the heat resistance, the mechanical strength, the adhesion to base material, and the like. In addition, the brightness enhancement film by using the polymerizable cholesteric liquid crystal material is also required to have high bandwidth reflection wavelength characteristics and high reflection brightness.

In order to realize an appropriate phase difference, the Δnd (refractive index anisotropy×film thickness) may be adjusted appropriately, and in order to enhance the heat resistance and the mechanical strength, a cross-linked structure may be introduced, that is, a compound having at least two polymerizable functional groups may be added appropriately. Meanwhile, as for realization of the high bandwidth reflection wavelength characteristics and the high reflection brightness of the thin film by using the polymerizable cholesteric liquid crystal material, it is possible to realize by using a high Δn polymerizable liquid crystal material and, in addition, using the technique in which compounds having different types of reactivity are combined, as shown in PTL 1.

However, it has been previously difficult to ensure compatibility between the low haze property, the uniformity in the phase difference (orientation state with no variations), and the adhesion. As for the adhesion, PTL 2 describes a method in which an oxime ester based photopolymerization initiator is used, PTL 3 describes a method in which a polymerizable phosphorus based compound is included, and PTL 4 describes a method in which both a silane coupling agent containing an amino group and an alcoholic polyfunctional molecule are added. However, the adhesion on the basis of the technique in PTL 2 or PTL 3 is not sufficient, and the technique in PTL 4 has a problem in that the amount of addition of a non-liquid crystalline compound is too large and, thereby, the transition point (Tni) of the liquid crystal is lowered. For the sake of the uniformity and avoidance of variation phenomenon, it is necessary that the solvent is dried at a temperature lower than or equal to the Tni of the polymerizable liquid crystal composition. However, if the Tni is low, it is not possible to set a sufficiently high drying temperature condition and, thereby, the volatilization rate of the solvent becomes not appropriate and variations occur easily.

Furthermore, enhancement of the solubility into the solvent is also an indispensable condition for the low haze, the uniformity in the phase difference, and avoidance of variation phenomenon. If the solubility into the solvent is poor, the composition becomes nonuniform, the uniformity of the phase difference and the orientation state are lost, and variations occur. Meanwhile, in the case where the polymerizable cholesteric liquid crystal material is used, the planar orientation state is converted to a focal conic state because of nonuniformity in the orientation state, the haze increases significantly by a light scattering effect caused by this focal conic state, and variations occur because the focal conic state is brought about partly.

CITATION LIST

Patent Literature

PTL 1: Japanese Unexamined Patent Application Publication No. 6-281814
PTL 2: Japanese Unexamined Patent Application Publication No. 2010-152217
PTL 3: Japanese Unexamined Patent Application Publication No. 2008-250108
PTL 4: Japanese Unexamined Patent Application Publication No. 2007-332270

SUMMARY OF INVENTION

Technical Problem

An issue solved by the present invention is to provide a polymerizable liquid crystal composition having excellent solubility into a solvent, exhibiting good adhesion to a base material, and being capable of realizing a thin film having low haze and no variations and, in addition, provide a thin film having excellent appearance by using the polymerizable liquid crystal composition.

Solution to Problem

In order to solve the above-described issue, combinations of various polymerizable liquid crystal compounds were studied and, as a result, the present invention has solved the issue.

That is, a polymerizable liquid crystal composition characterized by containing 5 to 30 percent by mass of compound having at least two polymerizable functional groups as a first component, wherein at least one of the compound having at least two polymerizable functional groups is represented by General formula (1),

[Chem. 1]

$$P^1\text{-}E^1\text{-}A^1\text{-}Z^1\text{-}A^2\text{-}Z^2\text{-}A^3\text{-}E^2\text{-}P^2 \qquad (1)$$

(in the formula, $P^1$ and $P^2$ represent independently an acrylate group or a methacrylate group,
$E^1$ and $E^2$ represent independently an alkylene group having the carbon atom number of 1 to 15, at least one methylene group present in the alkylene group may be substituted with an oxygen atom, —CO—, —OCO—, —COO—, or —CH═CH—, where oxygen atoms are not directly bonded to each other, $A^1$, $A^2$, and $A^3$ represent independently a 1,4-phenylene group or a 2,6-naphthylene group, the 1,4-phenylene group or the 2,6-naphthylene group may be unsubstituted or have at least one fluorine atom, chlorine atom, or alkyl group having the carbon atom number of 1 to 3 (at least one methylene group in the alkyl group may be substituted with an oxygen atom, —CO—, —OCO—, or —COO—, where oxygen atoms are not directly bonded to each other) as a substituent, at least one of $A^1$, $A^2$, and $A^3$ has a substituent, $Z^1$ and $Z^2$ represent independently —COO—, —OCO—, —CH$_2$CH$_2$—, —COO—CH$_2$CH$_2$—, —OCO—CH$_2$CH$_2$—, —CH$_2$CH$_2$—OCO—, —CH$_2$CH$_2$—OCO—, or a single bond) and at least one type of compound represented by General formula (2) as a second component

[Chem. 2]

(in the formula, $P^3$ represents independently an acrylate group or a methacrylate group, $E^3$ represents an alkylene group having the carbon atom number of 1 to 15, at least one methylene group present in the alkylene group may be substituted with an oxygen atom, —CO—, —OCO—, —COO—, or —CH=CH—, where oxygen atoms are not directly bonded to each other, $A^4$, $A^5$, and $A^6$ represent independently a 1,4-phenylene group or a 2,6-naphthylene group, the 1,4-phenylene group or the 2,6-naphthylene group may be unsubstituted or have at least one fluorine atom, chlorine atom, or alkyl group having the carbon atom number of 1 to 3 (at least one methylene group in the alkyl group may be substituted with an oxygen atom, —CO—, —OCO—, or —COO—, where oxygen atoms are not directly bonded to each other) as a substituent, at least one of $A^4$, $A^5$, and $A^6$ has a substituent, $Z^3$ and $Z^4$ represent independently —COO—, —OCO—, —CH$_2$CH$_2$—, or a single bond, $R^1$ represents a hydrogen atom, a fluorine atom, a chlorine atom, a cyano group, or an alkyl group having the carbon atom number of 1 to 15, and at least one methylene group present in the alkyl group may be substituted with an oxygen atom, —CO—, —OCO—, —COO—, or —CH=CH—, where oxygen atoms are not directly bonded to each other) and a thin film in which the composition serves as a constituent member are provided.

Advantageous Effects of Invention

The polymerizable liquid crystal composition according to the present invention is used and, thereby, a composition and a thin film having low haze and no variations and, in addition, having excellent adhesion to a base material can be obtained at a low cost.

DESCRIPTION OF EMBODIMENTS

The polymerizable liquid crystal composition according to the present invention contains 1. a compound having at least two polymerizable functional groups and 2. a polymerizable liquid crystal compound having one polymerizable functional group and is configured to include, as necessary, 3. a photopolymerization initiator, 4. a surfactant or a hydrocarbon based material (or a halogen-substituted product thereof), 5. a chiral compound in the case where a cholesteric liquid crystal is produced, and 6. other additives, as necessary.

(First Component)

The compound having at least two polymerizable functional groups takes on a cross-linked structure after polymerization and, therefore, is a material necessary for obtaining the heat resistance, the solvent resistance, and the like of the thin film. However, if a large amount of this material is used, polymerization shrinkage increases, and the adhesion to the base material is reduced.

At least one compound of the compound having at least two polymerizable functional groups is the compound represented by General formula (1) and is preferably formed from only the compound represented by General formula (1).

Furthermore, a compound represented by General formula (1-1)

[Chem. 3]

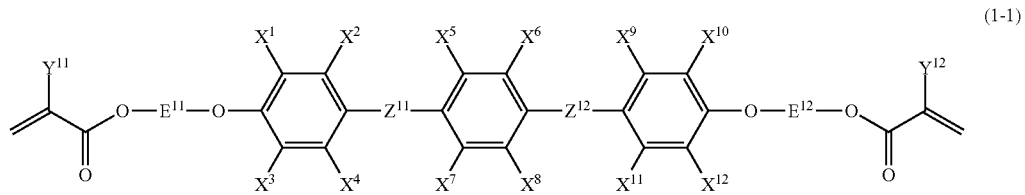

(in the formula, $Y^{11}$ and $Y^{12}$ represent independently a hydrogen atom or a methyl group, $E^{11}$ and $E^{12}$ represent independently an alkylene group having the carbon atom number of 1 to 13, at least one methylene group present in the alkylene group may be substituted with an oxygen atom, —CO—, —OCO—, —COO—, or —CH=CH—, where oxygen atoms are not directly bonded to each other, $X^1$ to $X^{12}$ represent independently a hydrogen atom, a fluorine atom, a chlorine atom, a methyl group, a methoxy group, a CF$_3$ group, or an OCF$_3$ group, one or more and three or less of them are a fluorine atom, a chlorine atom, a methyl group, a methoxy group, a CF$_3$ group, or an OCF$_3$ group, and $Z^{11}$ and $Z^{12}$ represent independently —COO—, —OCO—, or a single bond) is preferable.

In more preferable compound, $E^{11}$ and $E^{12}$ in General formula (1-1) are alkylene groups having the carbon atom number of 1 to 8, $X^1$ to $X^{12}$ are independently a hydrogen atom, a fluorine atom, a methyl group, or a methoxy group, one or more and three or less of them are a fluorine atom, a methyl group, or a methoxy group, and $Z^{11}$ and $Z^{12}$ are independently —COO— or —OCO—.

More specifically, a compound represented by General formula (1-2) is preferable.

[Chem. 4]

(1-2)

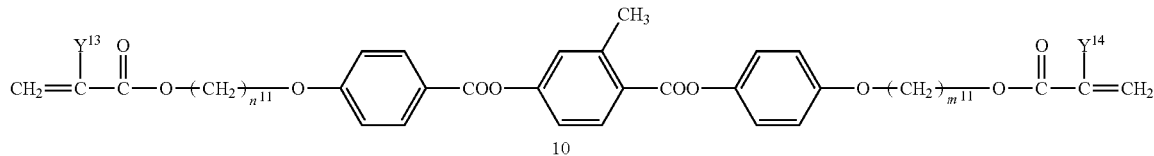

(in the formula, $Y^{13}$ and $Y^{14}$ represent independently a hydrogen atom or a methyl group, and $n^{11}$ and $m^{11}$ represent integers of 2 to 6)

In this regard, the content of the compound having at least two polymerizable functional groups is preferably 5 to 30 percent by mass, further preferably 8 to 24 percent by mass, still more preferably 10 to 19 percent by mass, and most preferably 10 to 15 percent by mass.

(Second Component)

Adjustment of the second component is an important point to form a thin film having low haze and no variations, which is an object of the present invention, and obtain properties required of a liquid crystal composition.

The second component contains a compound represented by General formula (2), and it is preferable that at least one of $A^4$, $A^5$, and $A^6$ be a 2,6-naphthylene group. Inclusion of the 2,6-naphthylene group is useful for achieving high Δn and high Tni. Meanwhile, as for $A^1$, $A^2$, and $A^3$, the 1,4-phenylene group or the 2,6-naphthylene group may have at least one fluorine atom, chlorine atom, methyl group, methoxy group, $CF_3$ group, or $OCF_3$ group as a substituent. The presence of substituent is useful for enhancing the solubility into a solvent.

It is preferable that, in General formula (2), $A^4$ be a 2,6-naphthylene group (the 2,6-naphthylene group may be unsubstituted or have at least one fluorine atom, chlorine atom, or alkyl group having the carbon atom number of 1 to 3 (at least one methylene group in the alkyl group may be substituted with an oxygen atom, —CO—, —OCO—, or —COO—, where oxygen atoms are not directly bonded to each other and at least one hydrogen atom in the alkyl group may be substituted with a fluorine atom) as a substituent or $A^6$ be represented by Formula (2-51) or Formula (2-52).

[Chem. 5]

(2-51)

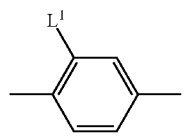

-continued (2-52)

(L¹ represents an alkyl group having the carbon atom number of 1 to 3, in which at least one hydrogen atom may be substituted with a fluorine atom, or an alkoxy group having the carbon atom number of 1 or 2)

More preferably, at least two types of compound represented by General formula (2) are included and, at least one of $A^4$, $A^5$, and $A^6$ in at least one type of compound among them is a 2,6-naphthylene group (the 2,6-naphthylene group may be unsubstituted or have at least one fluorine atom, chlorine atom, methyl group, methoxy group, $CF_3$ group, or $OCF_3$ group as a substituent). Further preferably, at least three types of compound represented by General formula (2) are included and, at least one of $A^4$, $A^5$, and $A^6$ in at least one type of compound among them is a 2,6-naphthylene group (the 2,6-naphthylene group may be unsubstituted or have at least one fluorine atom, chlorine atom, methyl group, methoxy group, $CF_3$ group, or $OCF_3$ group as a substituent).

It is preferable that at least one type of compound, in which $A^4$, $A^5$, or $A^6$ in General formula (2) is a 1,4-phenylene group, the 1,4-phenylene group may be unsubstituted or have at least one fluorine atom, chlorine atom, methyl group, methoxy group, $CF_3$ group, or $OCF_3$ group as a substituent, and at least one of $A^4$, $A^5$, and $A^6$ has at least one substituent, and at least two types of compound, in which at least one of $A^4$, $A^5$, and $A^6$ in General formula (2) is a 2,6-naphthylene group, the 2,6-naphthylene group and the 1,4-phenylene group may be unsubstituted or have at least one fluorine atom, chlorine atom, methyl group, methoxy group, $CF_3$ group, or $OCF_3$ group as a substituent, and at least one of $A^4$, $A^5$, and $A^6$ has at least one substituent, are included. In this regard, it is still more preferable that $R^1$ be an alkyl group having the carbon atom number of 1 to 15 (at least one methylene group present in the alkyl group may be substituted with an oxygen atom, —CO—, —OCO—, —COO—, or —CH=CH—, where oxygen atoms are not directly bonded to each other).

Furthermore, it is particularly preferable that the second component contains at least one type of compound represented by General formula (2-1) and at least two types of compound selected from the group consisting of compounds represented by General formulae (2-2) to (2-4).

[Chem. 6]

(2-1)

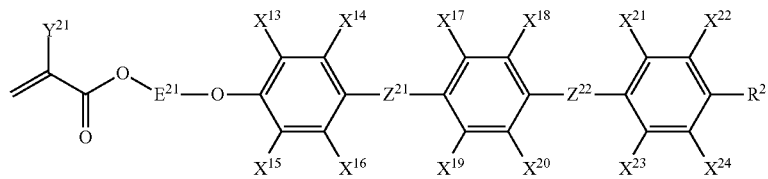

-continued (2-2)
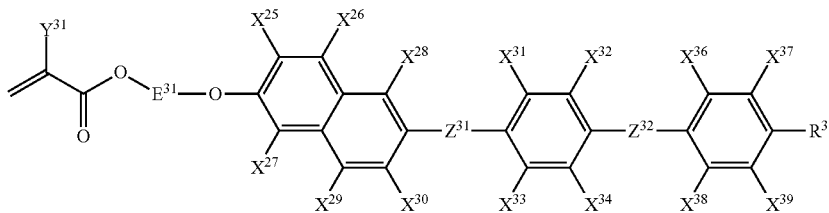

(2-3)
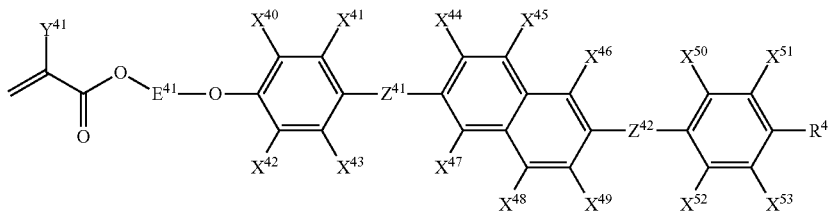

(2-4)
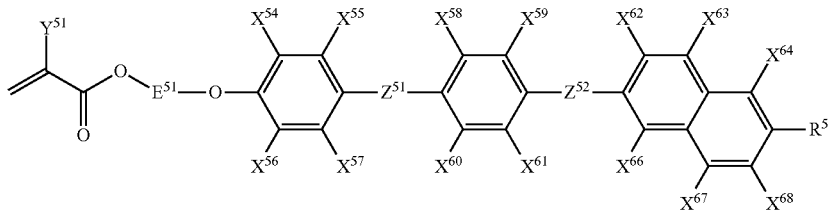

(in the formulae, $Y^{21}$, $Y^{31}$, $Y^{41}$, and $Y^{51}$ represent independently a hydrogen atom or a methyl group, $E^{21}$, $E^{31}$, $E^{41}$, and $E^{51}$ represent independently an alkylene group having the carbon atom number of 1 to 13, at least one methylene group present in the alkylene group may be substituted with an oxygen atom, —CO—, —OCO—, —COO—, or —CH=CH—, where oxygen atoms are not directly bonded to each other, $Z^{21}$, $Z^{22}$, $Z^{31}$, $Z^{32}$, $Z^{41}$, $Z^{42}$, $Z^{51}$, and $Z^{52}$ represent independently —COO—, —OCO—, or a single bond, $X^{13}$ to $X^{24}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, $X^{25}$ to $X^{39}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, $X^{40}$ to $X^{53}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, $X^{54}$ to $X^{68}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, and $R^2$ to $R^5$ represent independently a hydrogen atom, a fluorine atom, a chlorine atom, a cyano group, or an alkyl group having the carbon atom number of 1 to 15, and at least one methylene group present in the alkyl group may be substituted with an oxygen atom, —CO—, —OCO—, —COO—, or —CH=CH—, where oxygen atoms are not directly bonded to each other)

In addition, it is still more preferable that $Z^{21}$, $Z^{22}$, $Z^{31}$, $Z^{32}$, $Z^{41}$, $Z^{42}$, $Z^{51}$, and $Z^{52}$ be independently —COO— or —COO— and $R^2$ to $R^5$ are independently an alkyl group having the carbon atom number of 1 to 10 or an alkoxy group having the carbon atom number of 1 to 10.

Specifically, compounds represented by General formulae (2-5) to (2-21) are preferable.

[Chem. 7]

(2-5)
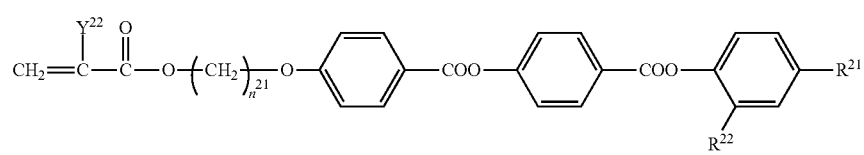

(2-6)
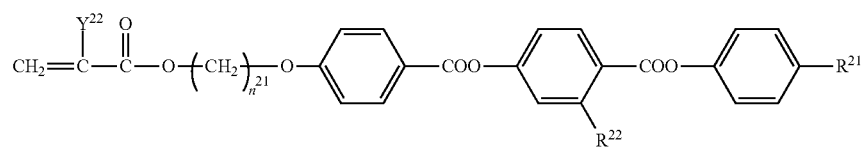

-continued
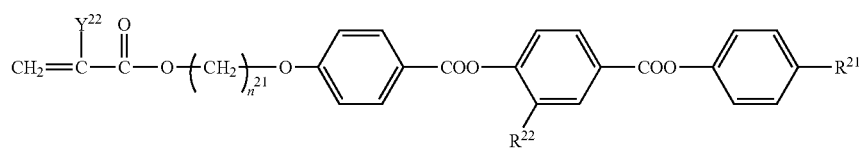
(2-7)
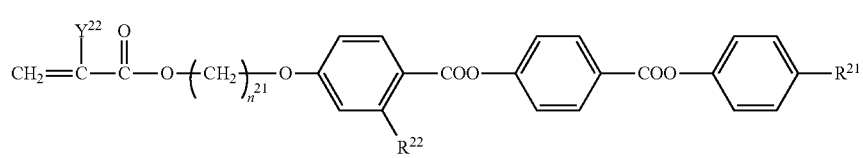
(2-8)
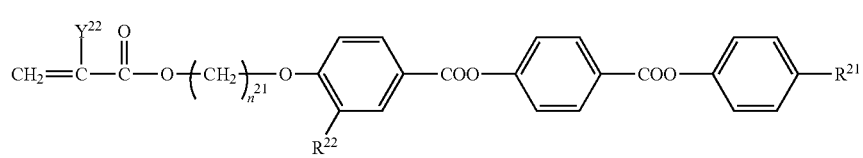
(2-9)
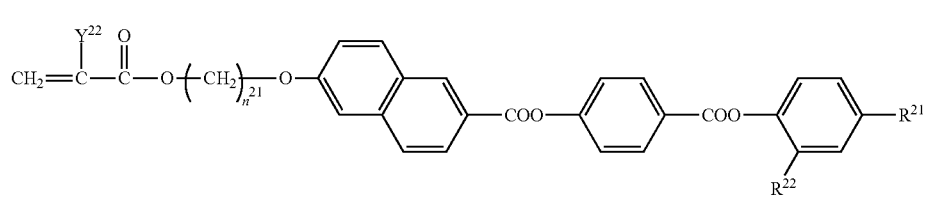
(2-10)
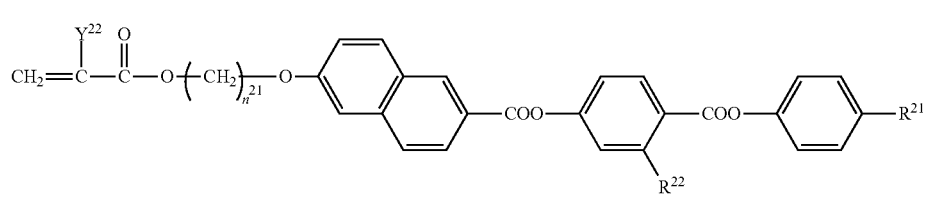
(2-11)
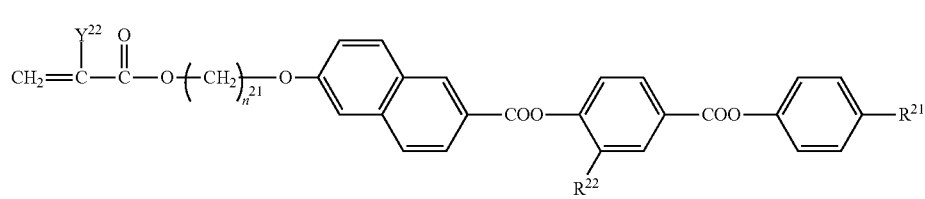
(2-12)
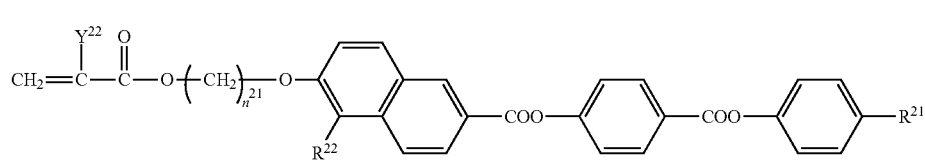
(2-13)
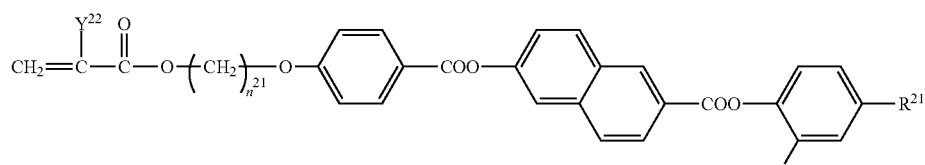
(2-14)
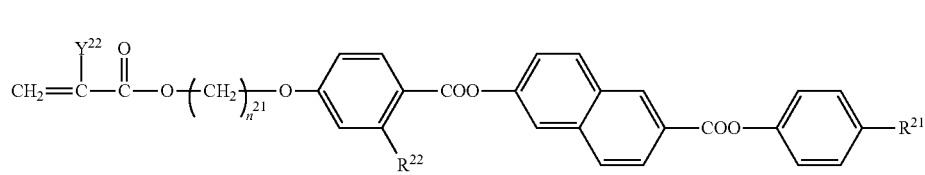
(2-15)

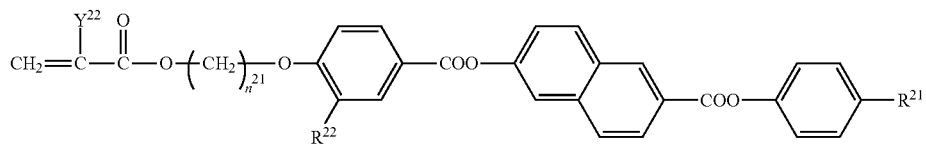

(2-16)

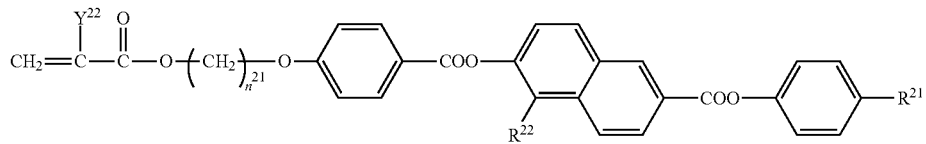

(2-17)

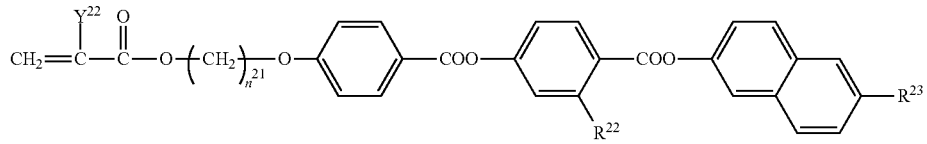

(2-18)

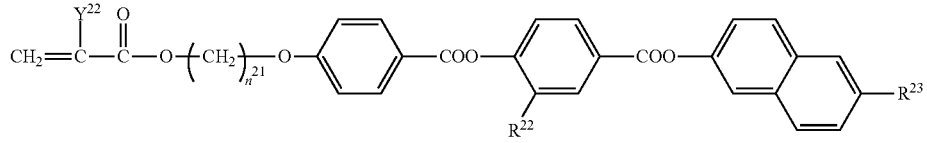

(2-19)

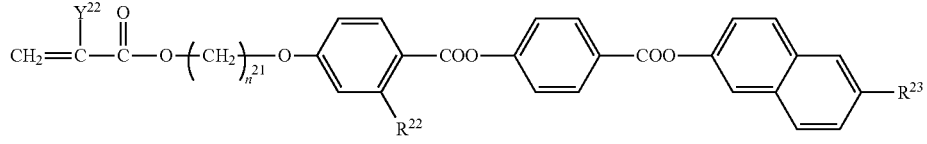

(2-20)

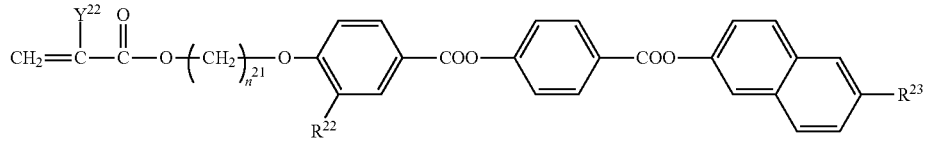

(2-21)

(in the formula, $Y^{22}$ represents a hydrogen atom or a methyl group, $R^{21}$ represents an alkyl group having the carbon atom number of 1 to 10 or an alkoxy group having the carbon atom number of 1 to 10, $R^{23}$ represents a hydrogen atom, an alkyl group having the carbon atom number of 1 to 10, or an alkoxy group having the carbon atom number of 1 to 10, $R^{22}$ represents a fluorine atom, a chlorine atom, a methyl group, or a methoxy group, and $n^{21}$ represents an integer of 1 to 6) Among the compounds represented by General formulae (2-5) to (2-21), General formulae (2-5), (2-7), (2-10), (2-12), (2-14), and (2-19) are preferable, and compounds in which $R^{21}$ and $R^{22}$ are methyl groups in General formula (2-5), $R^{21}$ is a methyl group, an ethyl group, or a propyl group and $R^{22}$ is a methoxy group or a chlorine atom in General formula (2-7), $R^{21}$ and $R^{22}$ are methyl groups in General formula (2-10), $R^{21}$ is a methyl group, an ethyl group, or a propyl group and $R^{22}$ is a methoxy group or a chlorine atom in General formula (2-12), $R^{21}$ and $R^{22}$ are methyl groups in General formula (2-14), and $R^{21}$ is a hydrogen atom, a methyl group, an ethyl group, or a propyl group and $R^{22}$ is a methoxy group or a chlorine atom in General formula (2-19) are particularly preferable.

As described above, the transition point of nematic phase (or cholesteric phase)-isotropic phase is increased and, in addition, the solubility into a solvent is ensured by using a tricyclic liquid crystal compound having a substituent at a lateral position as the second component and high Δn is ensured by specifying the ring structure to be a 1,4-phenylene group or a 2,6-naphthylene group. In addition, in the case where enhancement of the solubility between liquid crystal compounds is intended, it is preferable that liquid crystal skeletons are allowed to have similar structures and it is also preferable that the number of components be increased. In the case where realization of low cost is intended, it is preferable that an ester group be employed as the bonding group of the ring structure. The content of the second component is preferably 90 to 50 percent by mass, more preferably 85 to 60 percent by mass, still more preferably 83 to 65 percent by mass, and most preferably 80 to 70 percent by mass. Meanwhile, it is preferable that the compound represented by General formula (2-1) be 60 to 10 percent by mass and the total of the compounds selected from the group represented by General formulae (2-2) to (2-4) be 70 to 20 percent by mass. It is preferable that the compound represented by General formula (2-1) be 40 to 20 percent by mass and the total of the compounds selected from the group represented by General formulae (2-2) to (2-4) be 70 to 20 percent by mass, and more preferably 60 to 40 percent by mass. It is still more preferable that the compound represented by General formula (2-1) be 30 to 20 percent by mass and the total of the compounds selected from the group represented by General formulae (2-2) to (2-4) be 60 to 50 percent by mass.

(Third Component)

Preferably, the polymerizable liquid crystal composition according to the present invention contains at least one type of polymerization initiator as a third component.

The polymerization initiator as the third component is a compound useful for polymerizing the polymerizable liquid crystal composition according to the present invention efficiently. As for the polymerization initiator, a photopolymerization initiator is preferable and, specifically, the followings are preferable.

Irgacure 651, Irgacure 184, Irgacure 907, Irgacure 127, Irgacure 369, Irgacure 379, Irgacure 819, Irgacure OXE01, Irgacure OXE02, Lucirin TPO, and Darocur 1173 by BASF. Esacure 1001M, Esacure KIP150, Speedcure BEM, Speedcure BMS, Speedcure PBZ, and Benzophenone by LAMBSON.

One type of these polymerization initiator may be used, although at least two types may be used. A sensitizer and the like may be added.

The content of the polymerization initiator is preferably 2 to 10 percent by mass, and more preferably 3 to 7 percent by mass.

(Fourth Component)

Preferably, the polymerizable liquid crystal composition according to the present invention contains a surfactant or a compound including a repeating unit represented by General formula (3)

[Chem. 8]

(in the formula, $R^{11}$, $R^{12}$, $R^{13}$, and $R^{14}$ represent independently a hydrogen atom, a halogen atom, or a hydrocarbon group having the carbon atom number of 1 to 20 and hydrogen atoms in the hydrocarbon group may be substituted with at least one halogen atom) and having a weight average molecular weight of 100 or more as a fourth component.

The fourth component is a compound efficient for producing the effect in reducing a tilt angle of a liquid crystal compound at the interface to the air. Examples of surfactants which can be contained may include alkyl carboxylates, alkyl phosphates, alkyl sulfonates, fluoroalkyl carboxylates, fluoroalkyl phosphates, fluoroalkyl sulfonates, polyoxyethylene derivatives, fluoroalkylethylene oxide derivatives, polyethylene glycol derivatives, alkylammonium salts, fluoroalkylammonium salts, and silicone derivatives. In particular, fluorine-containing surfactants and silicone derivatives are preferable. Further specific examples may include "MEGAFAC F-110", "MEGAFACF-113", "MEGAFAC F-120", "MEGAFAC F-812", "MEGAFAC F-142D", "MEGAFAC F-144D", "MEGAFAC F-150", "MEGAFAC F-171", "MEGAFACF-173", "MEGAFAC F-177", "MEGAFAC F-183", "MEGAFAC F-195", "MEGAFAC F-824", "MEGAFAC F-833", "MEGAFAC F-114", "MEGAFAC F-410", "MEGAFAC F-493", "MEGAFAC F-494", "MEGAFAC F-443", "MEGAFAC F-444", "MEGAFAC F-445", "MEGAFAC F-446", "MEGAFAC F-470", "MEGAFAC F-471", "MEGAFAC F-474", "MEGAFAC F-475", "MEGAFAC F-477", "MEGAFAC F-478", "MEGAFAC F-479", "MEGAFAC F-480SF", "MEGAFAC F-482", "MEGAFAC F-483", "MEGAFAC F-484", "MEGAFAC F-486", "MEGAFAC F-487", "MEGAFAC F-489", "MEGAFAC F-172D", "MEGAFAC F-178K", "MEGAFAC F-178RM", "MEGAFAC R-08", "MEGAFAC R-30", "MEGAFAC F-472SF", "MEGAFAC BL-20", "MEGAFAC R-61", "MEGAFAC R-90", "MEGAFAC ESM-1", and "MEGAFAC MCF-350SF" (up to this point, produced by DIC Corporation), "Ftergent 100", "Ftergent 100C", "Ftergent 110", "Ftergent 150", "Ftergent 150CH", "Ftergent A", "Ftergent 100A-K", "Ftergent 501", "Ftergent 300", "Ftergent 310", "Ftergent 320", "Ftergent 400SW", "FTX-400P", "Ftergent 251", "Ftergent 215M", "Ftergent 212 MH", "Ftergent 250", "Ftergent 222F", "Ftergent 212D", "FTX-218", "FTX-209F", "FTX-213F", "FTX-233F", "Ftergent 245F", "FTX-208G", "FTX-240G", "FTX-260D", "FTX-220D", "FTX-230D", "FTX-240D", "FTX-207S", "FTX-211S", "FTX-220S", "FTX-230S", "FTX-750FM", "FTX-730FM", "FTX-730FL", "FTX-710FS", "FTX-710FM", "FTX-710FL", "FTX-750LL", "FTX-730LS", "FTX-730LM", "FTX-730LL", "FTX-710LL" (up to this point, produced by NEOS COMPANY LIMITED), "BYK-300", "BYK-302", "BYK-306", "BYK-307", "BYK-310", "BYK-315", "BYK-320", "BYK-322", "BYK-323", "BYK-325", "BYK-330", "BYK-331", "BYK-333", "BYK-337", "BYK-340", "BYK-344", "BYK-370", "BYK-375", "BYK-377", "BYK-350", "BYK-352", "BYK-354", "BYK-355", "BYK-356", "BYK-358N", "BYK-361N", "BYK-357", "BYK-390", "BYK-392", "BYK-UV3500", "BYK-UV3510", "BYK-UV3570", and "BYK-Silclean3700" (up to this point, produced by BYK Japan KK), and "TEGO Rad2100", "TEGO Rad2200N", "TEGO Rad2250", "TEGO Rad2300", "TEGO Rad2500", "TEGO Rad2600", and "TEGO Rad2700" (up to this point, produced by Evonik Tego Chemie).

The weight average molecular weight of the compound represented by General formula (3) is preferably 200 to 100,000, more preferably 300 to 10,000, and still more preferably 500 to 5,000.

Meanwhile, the surfactants and the compounds including the repeating unit represented by General formula (3) and having a weight average molecular weight of 100 or more may be used alone, a plurality of them may be used, or combinations thereof may be used.

The amount of addition of the surfactants and the compounds including the repeating unit represented by General formula (3) and having a weight average molecular weight of 100 or more is preferably 0.01 to 1 percent by mass, and more preferably 0.02 to 0.2 percent by mass.

(Fifth Component)

In the case where the polymerizable liquid crystal composition is specified to be a polymerizable cholesteric liquid crystal composition, a chiral compound is added as a fifth component. This is a compound necessary for obtaining a pitch having a selective reflection wavelength. Preferably, this chiral compound has a polymerizable functional group, and the polymerizable functional group is more preferably an acrylic group or a methacrylic group.

The HTP (helical twist power) relative to the composition system, to which addition is performed, is preferably 20 or more, more preferably 30 or more, and still more preferably 45 or more.

Specifically, compounds represented by General formulae (4-1) to (4-4) are preferable.

[Chem. 9]

(4-1)
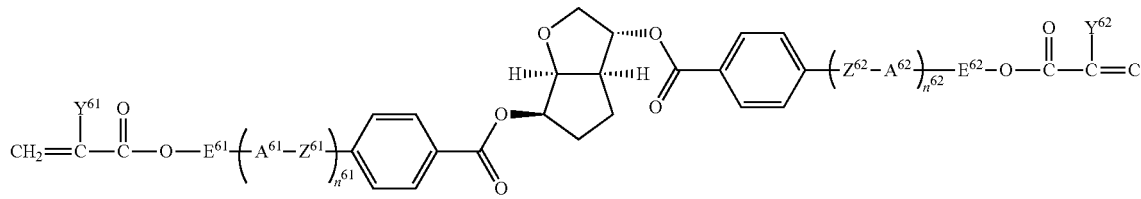

(4-2)
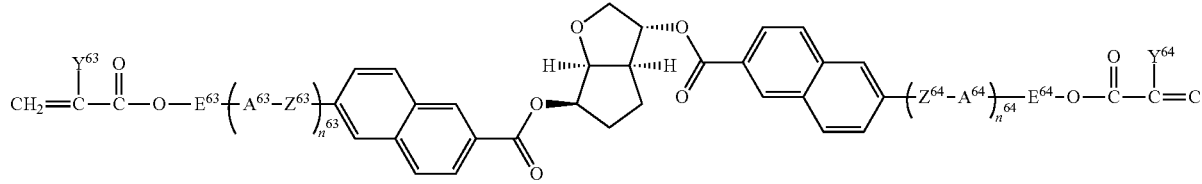

(4-3)
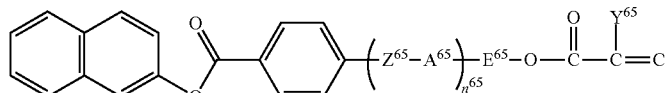

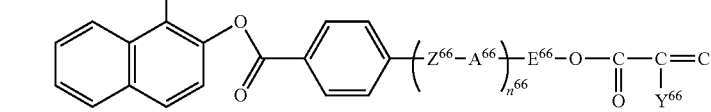

(4-4)
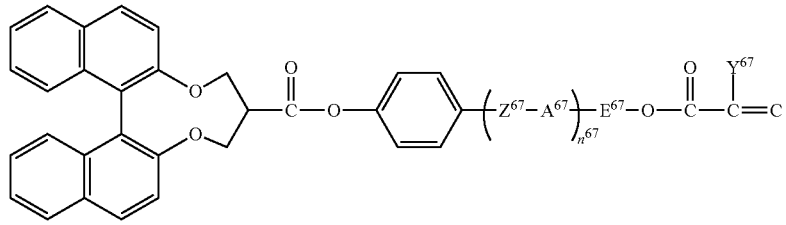

(in the formula, $Y^{61}$ to $Y^{67}$ represent a hydrogen atom or a methyl group, $A^{61}$ to $A^{67}$ represent independently a 1,4-phenylene group, a 1,4-cyclohexylene group, or a 2,6-naphthylene group, the 1,4-phenylene group and the 2,6-naphthylene group may be unsubstituted or have at least one fluorine atom, chlorine atom, methyl group, methoxy group, $CF_3$ group, or $OCF_3$ group as a substituent, $Z^{61}$ to $Z^{67}$ represent independently —COO—, —OCO—, —CH$_2$CH$_2$—, —COO—CH$_2$CH$_2$—, —OCO—CH$_2$CH$_2$—, —CH$_2$CH$_2$—OCO—, —CH$_2$CH$_2$—OCO—, or a single bond, $E^{61}$ to $E^{67}$ represent independently a single bond or an alkylene group having the carbon atom number of 1 to 15, at least one methylene group present in the alkylene group may be substituted with an oxygen atom, —CO—, —OCO—, —COO—, or —CH=CH—, where oxygen atoms are not directly bonded to each other, at least one hydrogen atom may be substituted with a methyl group, $n^{61}$ to $n^{67}$ represent independently 0, 1, or 2, and the arrangement of binaphthyl may be either an R body or an S body)

The content of chiral is preferably 3 to 10 percent by mass, and more preferably 3 to 7 percent by mass.

(Other Component)

In order to further enhance the adhesion to the base material, it is also preferable to add a chain transfer agent as other component. As for the chain transfer agent, thiol compounds are preferable, monothiol, dithiol, trithiol, and tetrathiol compounds are more preferable, and trithiol compounds are still more preferable. Specifically, General formulae (5-1) to (5-4) and General formulae (5-5) and (5-12) are preferable.

[Chem. 10]

(5-1)
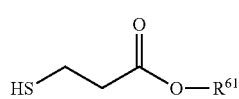

(5-2)
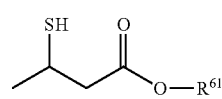

-continued

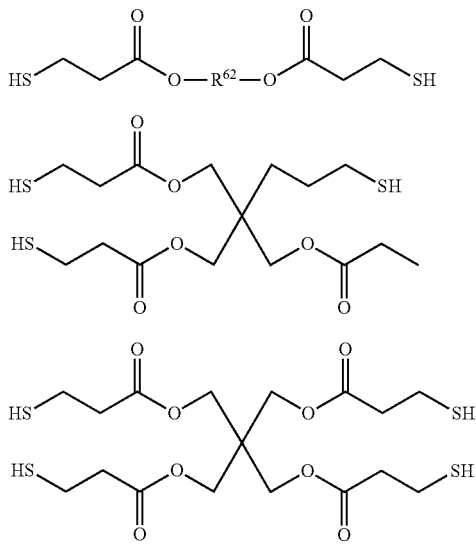
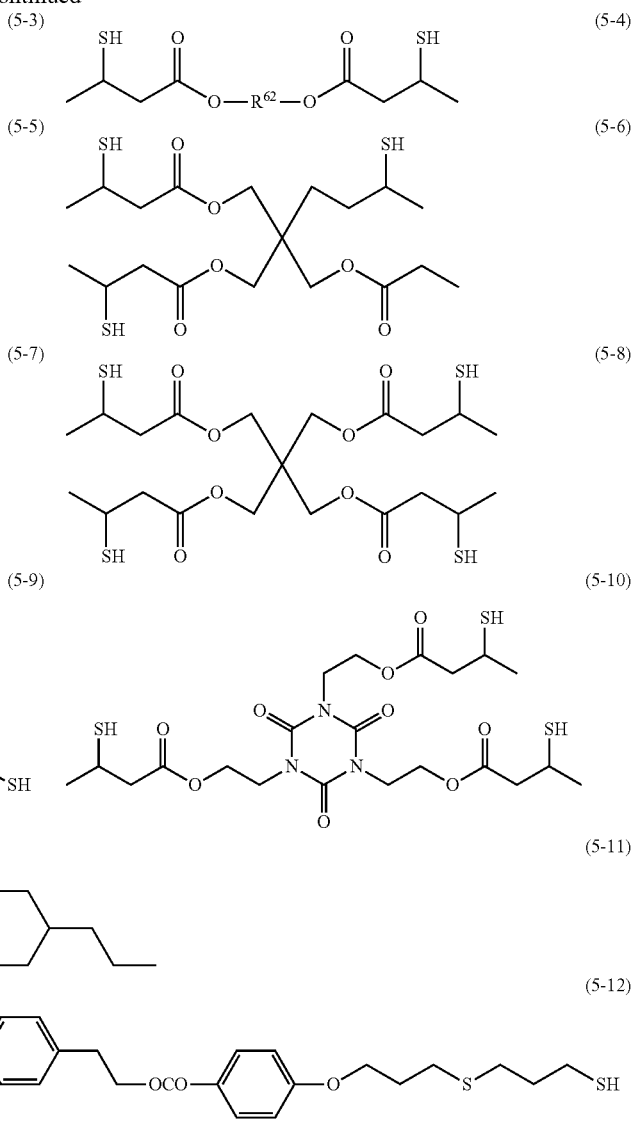

(in the formula, $R^{61}$ represents an alkyl group having the carbon atom number of 2 to 18, the alkyl group may be a straight chain or have a branched chain, at least one methylene group in the alkyl group may be substituted with an oxygen atom, a sulfur atom, —CO—, —OCO—, —COO—, or —CH=CH—, where oxygen atoms and sulfur atoms are not directly bonded to each other, $R^{62}$ represents an alkylene group having the carbon atom number of 2 to 18, and at least one methylene group in the alkylene group may be substituted with an oxygen atom, a sulfur atom, —CO—, —OCO—, —COO—, or —CH=CH—, where oxygen atoms and sulfur atoms are not directly bonded to each other)

The amount of addition of thiol compound is preferably 0.5 to 5.0 percent by mass, and more preferably 1.0 to 3.0 percent by mass.

Meanwhile, in order to enhance the storage stability, it is also preferable that a polymerization inhibitor, an antioxidant, and the like be added. Examples of such compounds include hydroquinone derivatives and hindered phenol based antioxidants. More specific examples include p-methoxyphenol and IRGANOX1010, IRGANOX1035, IRGANOX1076, IRGANOX1098, IRGANOX1135, IRGANOX1330, IRGANOX1425, IRGANOX1520, IRGANOX1726, IRGANOX245, IRGANOX259, IRGANOX3114, IRGANOX3790, IRGANOX5057, IRGANOX565, and the like produced by BASF.

The amount of addition of the polymerization inhibitor and the antioxidant is preferably 0.01 to 1.0 percent by mass, and more preferably 0.05 to 0.2 percent by mass.

Furthermore, in order to adjust the properties, it is also possible to add a liquid crystal compound which is not polymerizable, polymerizable compound which does not have liquid crystallinity, or the like, as necessary. The amount of addition of these compounds is preferably 20 percent by mass or less, more preferably 10 percent by mass or less, and still more preferably 5 percent by mass or less.

The polymerizable liquid crystal composition according to the present invention is used usually in the shape of being dissolved in a solvent. The solvent to be used is not specifically limited, although a solvent showing good solubility of the polymerizable liquid crystal compound is preferable, and it is preferable that the solvent can be dried at a temperature of 100° C. or lower. Examples of such solvents include aromatic hydrocarbons, e.g., toluene, xylene, cumene, and mesitylene, ester based solvents, e.g., methyl acetate, ethyl acetate, propyl acetate, and butyl acetate, ketone based solvents, e.g., methyl ethyl ketone, methyl isobutyl ketone, cyclohexanone, and cyclopentanone, ether based solvents, e.g., tetrahydrofuran, 1,2-dimethoxyethane, and anisole, amide based solvents, e.g., N,N-dimethylformamide and N-methyl-2-pyrrolidone, propylene glycol monomethyl ether acetate, diethylene glycol monomethyl ether acetate, γ-butyrolactone, and chlorobenzene. They may be used alone or at least two types may be used in combination.

The polymerizable liquid crystal composition is used in the present invention usually by coating and, therefore, the ratio of the solvent is not specifically limited insofar as the coated state is not impaired significantly. However, the solid content of the polymerizable liquid crystal composition is preferably 10 to 60 percent by mass, and further preferably 20 to 50 percent by mass.

(Production of Thin Film)

Next, a method for producing a thin film by using the polymerizable liquid crystal composition according to the present invention will be described. Usually, the polymerizable liquid crystal composition according to the present invention is used in a solution state of being dissolved in a solvent, the solution concerned is applied to a substrate or the like, drying is performed and, thereafter, polymerization is caused by ultraviolet rays or the like, so that the thin film according to the present invention is obtained.

The base material coated with the solution containing the polymerizable liquid crystal composition according to the present invention is a base material commonly used for a liquid crystal device, a display, an optical part, or an optical film and is not specifically limited insofar as the material has the heat resistance capable of enduring heating in drying after application of the polymerizable liquid crystal composition according to the present invention or in liquid crystal device production. Examples of such base materials include glass base materials, metal base materials, ceramic base materials, and organic materials, e.g., plastic base materials. In particular, in the case where the base material is an organic material, examples include cellulose derivatives, polyolefins, polyesters, polyethylene terephthalates, polycarbonates, polyacrylates, polyallylates, polyethersulfones, polyimides, polyphenylene sulfides, polyphenylene ethers, nylons, and polystyrenes. Furthermore, in order to add an optical value, the base material may be a pickup lens, a rod lens, an optical disc, a phase difference film, a light diffusion film, a color filter, or the like. In addition, the above-described base material may be subjected to an orientation treatment in such a way that the polymerizable liquid crystal composition according to the present invention is oriented easily when the polymerizable liquid crystal composition is applied and dried.

As for the coating method to obtain the thin film according to the present invention, a known conventional method, e.g., an applicator method, a bar coating method, a spin coating method, a gravure printing method, a flexographic method, an ink jet method, a die coating method, a cap coating method, and dipping, may be employed. In this regard, a drying treatment to remove the solvent is usually performed after the coating. The drying treatment temperature is preferably a temperature lower than or equal to the transition point of the polymerizable liquid crystal composition and, in addition, lower than or equal to the glass transition temperature of the base material in the case where the base material is an organic material.

The dried thin film is subjected to a polymerization treatment usually by ultraviolet rays and, thereby, the orientation state is immobilized. In order to obtain high bandwidth reflection wavelength characteristics, an appropriate heat treatment and an appropriate amount of ultraviolet irradiation may be selected in the ultraviolet polymerization process or a plurality of conditions may be combined.

EXAMPLES

The present invention will be described below with reference to examples and comparative examples, although the present invention is not limited to them. In this regard, the term "part" and "%" are on a mass basis unless otherwise specified.

Predetermined ratio of polymerizable liquid crystal compositions shown in examples and comparative examples were put into a sample bottle, cyclohexanone was added in an amount 1.5 times the solid content of the polymerizable liquid crystal composition on a mass basis, and heating and agitation were performed for 15 minutes with a hot stirrer at 80° C. to 100° C., so as to obtain a transparent homogeneous solution. Subsequently, an appropriate amount of the polymerizable liquid crystal composition solution was dropped to a PET film, which had been subjected to a rubbing treatment and which had a size of 100×100 mm, and was applied to the PET film with a bar coater (No. 9). The PET film coated with the solution was stood for 3 minutes in a constant temperature bath at 100° C. to dry and remove the solvent. Thereafter, the resulting PET film was put into a conveyor type UV irradiation apparatus set in such a way that the illuminance of the UV light became 450 mJ/cm², and the polymerizable liquid crystal composition was cured and, thereby, a thin film having a selective reflection wavelength in the visible light region was obtained.

The haze of the resulting thin film was measured by using Haze Meter NDH2000 produced by NIPPON DENSHOKU INDUSTRIES CO., LTD. Variations were visually observed. The transition point of the polymerizable liquid crystal composition before UV curing was measured by using Temperature Control System FP-80 and Hot Stage FP82 produced by METTLER TOLEDO. The cross cut test was performed by a technique in conformity with old JIS K5400.

The compounds used are expressed by the following codes.

[Chem. 11]

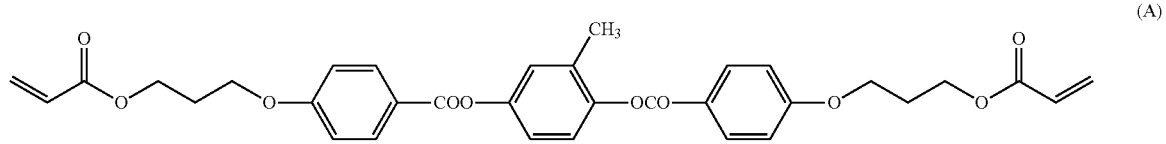

(A)

-continued
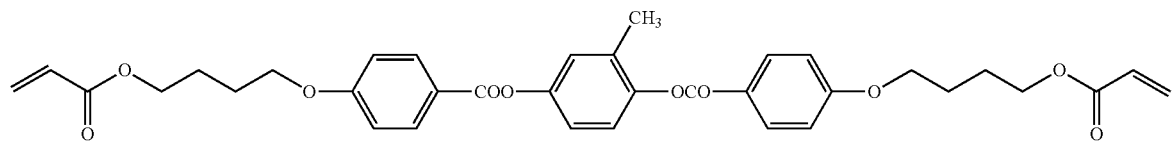
(B)
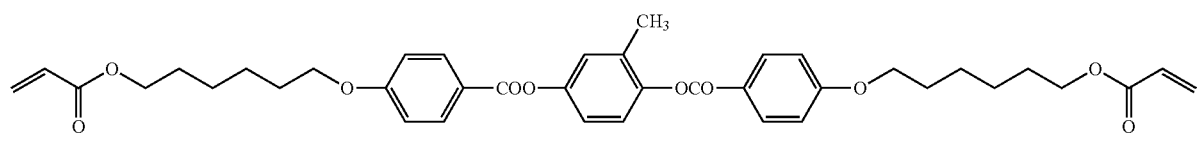
(C)
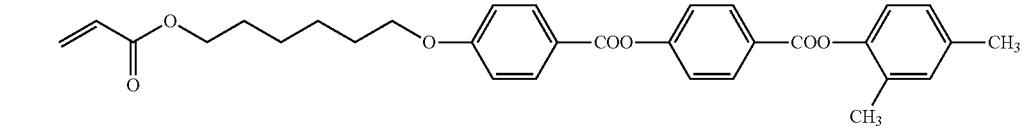
(D)
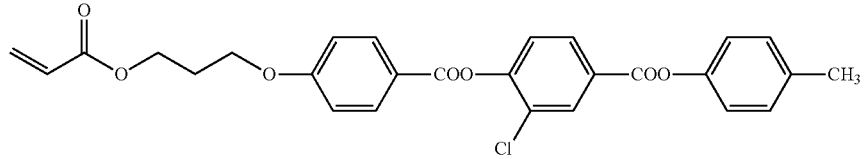
(E)
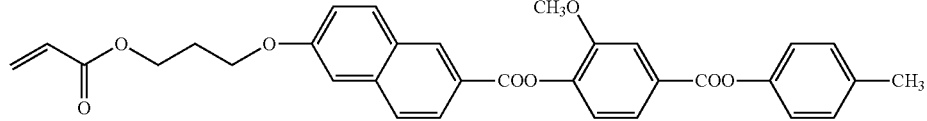
(F)
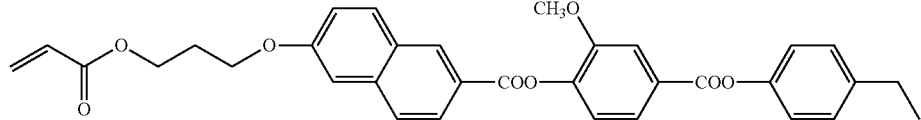
(G)
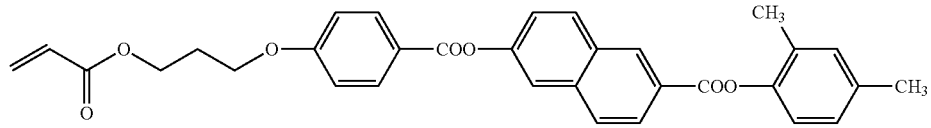
(H)
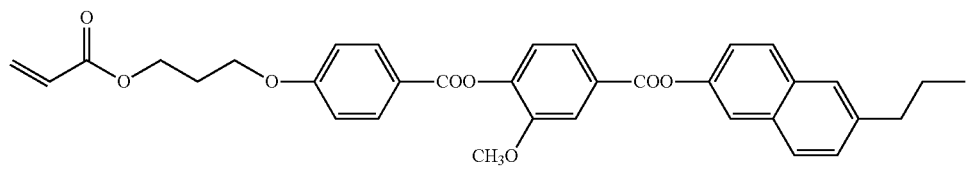
(I)
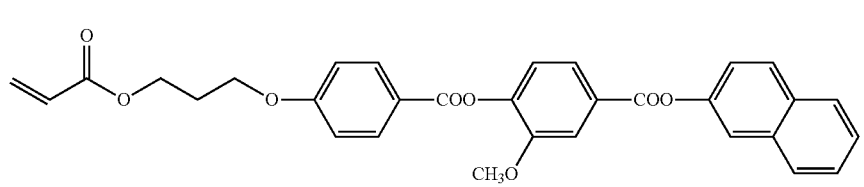
(J)
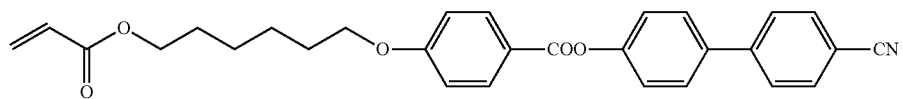
(K)

-continued

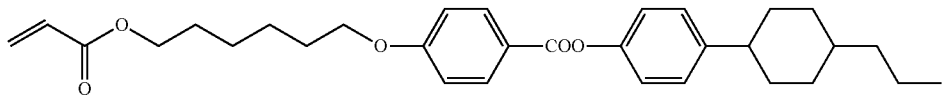
(L)

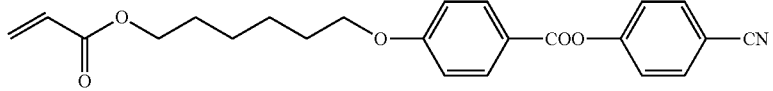
(M)

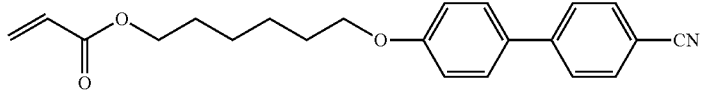
(N)

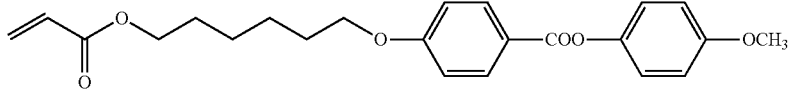
(O)

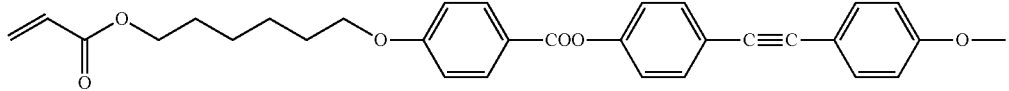
(P)

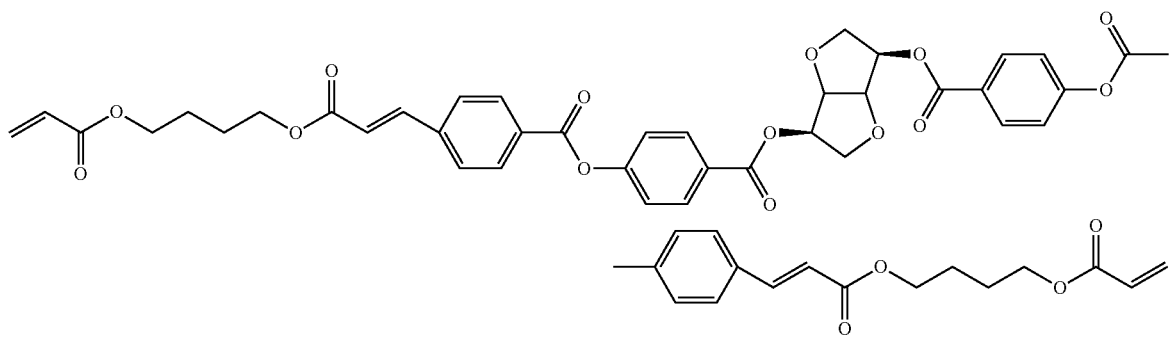
(Q)

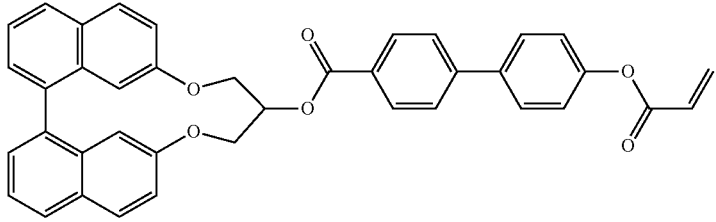
(R)

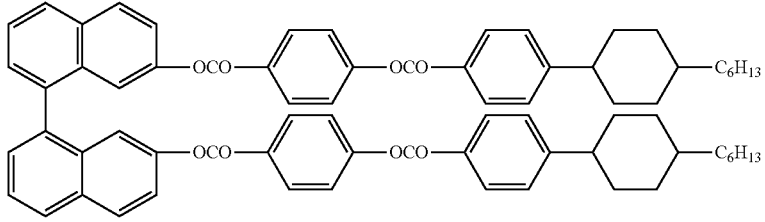
(S)

Meanwhile, the following compounds were used as the additives.

As for thiol, 3-mercaptopropionate (TMMP) produced by SC Organic Chemical Co., Ltd. As for the photopolymerization initiator, Irgacure 907 (Irg. 907) produced by BASF.

As for the polymerization inhibitor, p-methoxyphenol (MEHQ) produced by Wako Pure Chemical Industries, Ltd. As for the compound to reduce a tilt angle of a liquid crystal compound at an interface to the air, polypropylene (PP) having a weight average molecular weight of 2,000.

Example 1

A thin film was obtained by the above-described method, where 5.0% of Polymerizable liquid crystal compound (A) and 5.0% of (B) which were the first components, 29.0% of Polymerizable liquid crystal compound (D), 29.0% of (F), and 29.0% of (H) which were the second components, 2.8% of polymerization initiator Irg. 907 which was the third component, 0.1% of PP which was the fourth component, and 0.1% of MEHQ which was other component were mixed. The haze of the resulting thin film was 1.8%, there were no variations, and 55 squares remained in the cross cut test.

Example 2

A thin film was obtained by the above-described method, where 4.7% of Polymerizable liquid crystal compound (A) and 4.7% of (B) which were the first components, 28.2% of Polymerizable liquid crystal compound (D), 28.2% of (F), and 28.2% of (H) which were the second components, 2.8% of polymerization initiator Irg. 907 which was the third component, 0.1% of PP which was the fourth component, and 3.0% of TMMP and 0.1% of MEHQ which were other components were mixed. The haze of the resulting thin film was 1.8%, there were no variations, and all 100 squares remained in the cross cut test.

Example 3

A thin film was obtained by the above-described method, where 8.5% of Polymerizable liquid crystal compound (A) and 3.6% of (B) which were the first components, 24.6% of Polymerizable liquid crystal compound (D), 27.4% of (F), and 27.4% of (H) which were the second components, 3.0% of polymerization initiator Irg. 907 which was the third component, 0.1% of PP which was the fourth component, 5.3% of Chiral compound (Q) which was the fifth component, and 0.1% of MEHQ which was other component were mixed. The haze of the resulting thin film was 1.7%, there were no variations, and 50 squares remained in the cross cut test.

Example 4

A thin film was obtained by the above-described method, where 8.0% of Polymerizable liquid crystal compound (A) and 3.5% of (B) which were the first components, 24.0% of Polymerizable liquid crystal compound (D), 26.5% of (F), and 26.5% of (H) which were the second components, 3.0% of polymerization initiator Irg. 907 which was the third component, 0.1% of PP which was the fourth component, 5.3% of Chiral compound (Q) which was the fifth component, and 3.0% of TMMP and 0.1% of MEHQ which were other components were mixed. The haze of the resulting thin film was 1.8%, there were no variations, and all 100 squares remained in the cross cut test.

Example 5

A thin film was obtained by the above-described method, where 4.5% of Polymerizable liquid crystal compound (A) and 4.5% of (B) which were the first components, 26.5% of Polymerizable liquid crystal compound (D), 26.5% of (G), and 26.5% of (H) which were the second components, 3.0% of polymerization initiator Irg. 907 which was the third component, 0.1% of PP which was the fourth component, 5.3% of Chiral compound (Q) which was the fifth component, and 3.0% of TMMP and 0.1% of MEHQ which were other components were mixed. The haze of the resulting thin film was 2.0%, there were no variations, and all 100 squares remained in the cross cut test.

Example 6

A thin film was obtained by the above-described method, where 4.2% of Polymerizable liquid crystal compound (A) and 4.2% of (C) which were the first components, 31.0% of Polymerizable liquid crystal compound (D), 31.0% of (H), and 18.0% of (J) which were the second components, 3.0% of polymerization initiator Irg. 907 which was the third component, 0.1% of PP which was the fourth component, 5.4% of Chiral compound (Q) which was the fifth component, and 3.0% of TMMP and 0.1% of MEHQ which were other components were mixed. The haze of the resulting thin film was 2.4%, there were no variations, and all 100 squares remained in the cross cut test.

Example 7

A thin film was obtained by the above-described method, where 8.0% of Polymerizable liquid crystal compound (A) and 3.5% of (C) which were the first components, 24.0% of Polymerizable liquid crystal compound (D), 26.5% of (H), and 26.5% of (I) which were the second components, 3.0% of polymerization initiator Irg. 907 which was the third component, 0.1% of PP which was the fourth component, 5.3% of Chiral compound (Q) which was the fifth component, and 3.0% of TMMP and 0.1% of MEHQ which were other components were mixed. The haze of the resulting thin film was 2.2%, there were no variations, and all 100 squares remained in the cross cut test.

Example 8

A thin film was obtained by the above-described method, where 4.5% of Polymerizable liquid crystal compound (A) and 4.5% of (C) which were the first components, 26.8% of Polymerizable liquid crystal compound (E), 26.8% of (G), and 26.8% of (H) which were the second components, 3.0% of polymerization initiator Irg. 907 which was the third component, 0.1% of PP which was the fourth component, 4.4% of Chiral compound (R) which was the fifth component, and 3.0% of TMMP and 0.1% of MEHQ which were other components were mixed. The haze of the resulting thin film was 1.8%, there were no variations, and all 100 squares remained in the cross cut test.

Example 9

A thin film was obtained by the above-described method, where 8.0% of Polymerizable liquid crystal compound (A) and 3.5% of (C) which were the first components, 24.0% of Polymerizable liquid crystal compound (D), 27.0% of (F), and 27.0% of (H) which were the second components, 3.0% of polymerization initiator Irg. 907 which was the third component, 0.1% of PP which was the fourth component, 4.3% of Chiral compound (S) which was the fifth component, and 3.0% of TMMP and 0.1% of MEHQ which were other components were mixed. The haze of the resulting thin film was 2.2%, there were no variations, and all 100 squares remained in the cross cut test.

Example 10

A thin film was obtained by the above-described method, where 4.5% of Polymerizable liquid crystal compound (A)

and 4.5% of (B) which were the first components, 40.0% of Polymerizable liquid crystal compound (D), 31.0% of (H), and 8.0% of (O) which were the second components, 3.0% of polymerization initiator Irg. 907 which was the third component, 0.1% of PP which was the fourth component, 5.3% of Chiral compound (Q) which was the fifth component, and 3.0% of TMMP and 0.1% of MEHQ which were other components were mixed. The haze of the resulting thin film was 4.8%, there were almost no variations, and all 100 squares remained in the cross cut test.

Comparative Example 1

A thin film was obtained by the above-described method, where 28.9% of Polymerizable liquid crystal compound (A) and 28.9% of (C) which were the first components, 20.0% of Polymerizable liquid crystal compound (K) and 19.0% of (N) which were the second components, 3.0% of polymerization initiator Irg. 907 which was the third component, 0.1% of PP which was the fourth component, and 0.1% of MEHQ which was other component were mixed. The haze of the resulting thin film was 5.8%, there were variations, and 0 squares remained, that is, no square remained in the cross cut test.

Comparative Example 2

A thin film was obtained by the above-described method, where 28.1% of Polymerizable liquid crystal compound (A) and 28.1% of (C) which were the first components, 19.0% of Polymerizable liquid crystal compound (K) and 18.6% of (N) which were the second components, 3.0% of polymerization initiator Irg. 907 which was the third component, 0.1% of PP which was the fourth component, and 3.0% of TMMP and 0.1% of MEHQ which were other components were mixed. The haze of the resulting thin film was 8.8%, there were variations, and 0 squares remained, that is, no square remained in the cross cut test.

Comparative Example 3

A thin film was obtained by the above-described method, where 28.0% of Polymerizable liquid crystal compound (A) and 28.0% of (C) which were the first components, 32.1% of Polymerizable liquid crystal compound (D) which was the second component, 3.0% of polymerization initiator Irg. 907 which was the third component, 0.1% of PP which was the fourth component, 5.7% of Chiral compound (Q) which was the fifth component, and 3.0% of TMMP and 0.1% of MEHQ which were other components were mixed. The haze of the resulting thin film was 20.5%, there were variations, and 0 squares remained, that is, no square remained in the cross cut test.

Comparative Example 4

A thin film was obtained by the above-described method, where 28.0% of Polymerizable liquid crystal compound (A) and 28.0% of (C) which were the first components, 16.0% of Polymerizable liquid crystal compound (E) and 16.0% of (L) which were the second components, 3.0% of polymerization initiator Irg. 907 which was the third component, 0.1% of PP which was the fourth component, 5.8% of Chiral compound (Q) which was the fifth component, and 3.0% of TMMP and 0.1% of MEHQ which were other components were mixed. The haze of the resulting thin film was 2.5%, and there were no variations. However, 0 squares remained, that is, no square remained in the cross cut test.

Comparative Example 5

A thin film was obtained by the above-described method, where 4.5% of Polymerizable liquid crystal compound (A) and 4.5% of (C) which were the first components, 31.0% of Polymerizable liquid crystal compound (D), 35.0% of (K), and 12.8% of (M) which were the second components, 3.0% of polymerization initiator Irg. 907 which was the third component, 0.1% of PP which was the fourth component, 6.0% of Chiral compound (Q) which was the fifth component, and 3.0% of TMMP and 0.1% of MEHQ which were other components were mixed. As for the resulting thin film, all 100 squares remained in the cross cut test, although the haze was 44.8%, and there were variations.

Comparative Example 6

A thin film was obtained by the above-described method, where 4.5% of Polymerizable liquid crystal compound (A) and 4.5% of (C) which were the first components, 26.2% of Polymerizable liquid crystal compound (D), 26.2% of (L), and 26.2% of (P) which were the second components, 3.0% of polymerization initiator Irg. 907 which was the third component, 0.1% of PP which was the fourth component, 6.2% of Chiral compound (Q) which was the fifth component, and 3.0% of TMMP and 0.1% of MEHQ which were other components were mixed. As for the resulting thin film, all 100 squares remained in the cross cut test, although the haze was 56.8%, and there were variations.

Comparative Example 7

A thin film was obtained by the above-described method, where 4.5% of Polymerizable liquid crystal compound (A) and 4.5% of (C) which were the first components, 31.0% of Polymerizable liquid crystal compound (E), 17.0% of (O), and 31.0% of (P) which were the second components, 3.0% of polymerization initiator Irg. 907 which was the third component, 0.1% of PP which was the fourth component, 5.8% of Chiral compound (Q) which was the fifth compound, and 3.0% of TMMP and 0.1% of MEHQ which were other components were mixed. As for the resulting thin film, all 100 squares remained in the cross cut test, although the haze was 61.5%, and there were variations.

The above-described results are summarized in Tables 1 to 3. In the tables, the Tni is also described as the other property. The cross cut test shows the number of remaining squares of 100 squares. The symbol "⊙" indicates that there are no variations, the symbol "○" indicates that there are almost no variations, and the symbol "x" indicates that there are variations.

TABLE 1

| Component | Compound | Example 1 | Example 2 | Example 3 | Example 4 | Example 5 |
|---|---|---|---|---|---|---|
| First component | A (%) | 5.0 | 4.7 | 8.5 | 8.0 | 4.5 |
|  | B (%) | 5.0 | 4.7 | 3.6 | 3.5 | 4.5 |
|  | C (%) |  |  |  |  |  |
| Second component | D (%) | 29.0 | 28.2 | 24.6 | 24.0 | 26.5 |
|  | F (%) | 29.0 | 28.2 | 27.4 | 26.5 |  |
|  | G (%) |  |  |  |  | 26.5 |
|  | H (%) | 29.0 | 28.2 | 27.4 | 26.5 | 26.5 |

TABLE 1-continued

| Component | Compound | Example 1 | Example 2 | Example 3 | Example 4 | Example 5 |
|---|---|---|---|---|---|---|
| Third component | Irg.907 (%) | 2.8 | 2.8 | 3.0 | 3.0 | 3.0 |
| Fourth component | PP (%) | 0.1 | 0.1 | 0.1 | 0.1 | 0.1 |
| Fifth component | Q (%) | | | 5.3 | 5.3 | 5.3 |
| Sixth component | TMMP (%) | | 3.0 | | 3.0 | 3.0 |
| Other component | MEHQ (%) | 0.1 | 0.1 | 0.1 | 0.1 | 0.1 |
| Total | (%) | 100 | 100 | 100 | 100 | 100 |
| Tni | (° C.) | 147 | 140 | 129 | 117 | 117 |
| Haze | (%) | 1.8 | 1.8 | 1.7 | 1.8 | 2 |
| Variations | | ⊙ | ⊙ | ⊙ | ⊙ | ⊙ |
| Cross cut test | | 55 | 100 | 50 | 100 | 100 |

TABLE 2

| Component | Compound | Example 6 | Example 7 | Example 8 | Example 9 | Example 10 |
|---|---|---|---|---|---|---|
| First component | A (%) | 4.2 | 8.0 | 4.5 | 8.0 | 4.5 |
| | B (%) | 4.2 | | | | 4.5 |
| | C (%) | | 3.5 | 4.5 | 3.5 | |
| Second component | D (%) | 31.0 | 24.0 | | 24.0 | 40.0 |
| | E (%) | | | 26.8 | | |
| | F (%) | | | | 27.0 | |
| | G (%) | | | 26.8 | | |
| | H (%) | 31.0 | 26.5 | 26.8 | 27.0 | 31.0 |
| | I (%) | | 26.5 | | | |
| | J (%) | 18.0 | | | | |
| | O (%) | | | | | 8.0 |
| Third component | Irg.907 (%) | 3.0 | 3.0 | 3.0 | 3.0 | 3.0 |
| Fourth component | PP (%) | 0.1 | 0.1 | 0.1 | 0.1 | 0.1 |
| Fifth component | Q (%) | 5.4 | 5.3 | | | 5.8 |
| | R (%) | | | 4.4 | | |
| | S (%) | | | | 4.3 | |
| Sixth component | TMMP (%) | 3.0 | 3.0 | 3.0 | 3.0 | 3.0 |
| Other component | MEHQ (%) | 0.1 | 0.1 | 0.1 | 0.1 | 0.1 |
| Total | (%) | 100 | 100 | 100 | 100 | 100 |
| Tni | (° C.) | 106 | 121 | 133 | 119 | 101 |
| Haze | (%) | 2.4 | 2.2 | 1.8 | 2.2 | 4.8 |
| Variations | | ⊙ | ⊙ | ⊙ | ⊙ | ○ |
| Cross cut test | | 100 | 100 | 100 | 100 | 100 |

TABLE 3

| Component | Compound | Comparative example 1 | Comparative example 2 | Comparative example 3 | Comparative example 4 | Comparative example 5 | Comparative example 6 | Comparative example 7 |
|---|---|---|---|---|---|---|---|---|
| First component | A (%) | 28.9 | 28.1 | 28.0 | 28.0 | 4.5 | 4.5 | 4.5 |
| | C (%) | 28.9 | 28.1 | 28.0 | 28.0 | 4.5 | 4.5 | 4.5 |
| Second component | D (%) | | | 32.1 | | | 31.0 | 26.2 |
| | E (%) | | | | 16.0 | | | 31.0 |
| | K (%) | 20.0 | 19.0 | | | 35.0 | | |
| | L (%) | | | 16.0 | | | 26.2 | |
| | M (%) | | | | 12.8 | | | |
| | N (%) | 19.0 | 18.6 | | | | | |
| | O (%) | | | | | | | 17.0 |
| | P (%) | | | | | | 26.2 | 31.0 |
| Third component | Irg.907 (%) | 3.0 | 3.0 | 3.0 | 3.0 | 3.0 | 3.0 | 3.0 |
| Fourth component | PP (%) | 0.1 | 0.1 | 0.1 | 0.1 | 0.1 | 0.1 | 0.1 |
| Fifth component | Q (%) | | | 5.7 | 5.8 | 6.0 | 6.2 | 5.8 |
| Sixth component | TMMP (%) | | 3.0 | 3.0 | 3.0 | 3.0 | 3.0 | 3.0 |
| Other component | MEHQ (%) | 0.1 | 0.1 | 0.1 | 0.1 | 0.1 | 0.1 | 0.1 |
| Total | | 100 | 100 | 100 | 100 | 100 | 100 | 100 |
| Tni | (° C.) | 109 | 96 | 95 | 100 | 102 | 112 | 101 |
| Haze | (%) | 5.8 | 8.8 | 20.5 | 2.5 | 44.8 | 56.8 | 61.5 |

TABLE 3-continued

| Component | Compound | Comparative example 1 | Comparative example 2 | Comparative example 3 | Comparative example 4 | Comparative example 5 | Comparative example 6 | Comparative example 7 |
|---|---|---|---|---|---|---|---|---|
| Variations | | × | × | × | ⊙ | × | × | × |
| Cross cut test | | 0 | 0 | 0 | 0 | 100 | 100 | 100 |

It is clear that, in Examples 1 to 10, the haze values are low, there are no variations, and the adhesion is ensured as compared with those in Comparative examples 1 to 7. Meanwhile, the haze values in Examples 1 to 9 are smaller than the haze value in Example 10. Therefore, it is clear that the haze is reduced in the case where three types of compounds having three ring structures are included. As is clear from comparisons between Examples 1 and 2 and Examples 3 and 4, the adhesion is enhanced in the case where thiol is contained as the other component.

The invention claimed is:

1. A polymerizable liquid crystal composition characterized by comprising:

5 to 30 percent by mass of compound having at least two polymerizable functional groups as a first component, wherein at least one of the compound having at least two polymerizable functional groups is represented by General formula (1), $$P^1\text{-}E^1\text{-}A^1\text{-}Z^1\text{-}A^2\text{-}Z^2\text{-}A^3\text{-}E^2\text{-}P^2 \quad (1)$$

(in the formula, $P^1$ and $P^2$ represent independently an acrylate group or a methacrylate group, $E^1$ and $E^2$ represent independently an alkylene group having the carbon atom number of 1 to 15, at least one methylene group present in the alkylene group may be substituted with an oxygen atom, —CO—, —OCO—, —COO—, or —CH=CH—, where oxygen atoms are not directly bonded to each other, $A^1$, $A^2$, and $A^3$ represent independently a 1,4-phenylene group or a 2,6-naphthylene group, the 1,4-phenylene group or the 2,6-naphthylene group may be unsubstituted or have at least one fluorine atom, chlorine atom, or alkyl group having the carbon atom number of 1 to 3 (at least one methylene group in the alkyl group may be substituted with an oxygen atom, —CO—, —OCO—, or —COO—, where oxygen atoms are not directly bonded to each other) as a substituent, at least one of $A^1$, $A^2$, and $A^3$ has a substituent, $Z^1$ and $Z^2$ represent independently —COO—, —OCO—, —CH$_2$CH$_2$—, —COO—CH$_2$CH$_2$—, —OCO—CH$_2$CH$_2$—, —CH$_2$CH$_2$—COO—, —CH$_2$CH$_2$—OCO—, or a single bond) and at least one type of compound represented by General formula (2) as a second component $$P^3\text{-}E^3\text{-}A^4\text{-}Z^3\text{-}A^5\text{-}Z^4\text{-}A^6\text{-}R^1 \quad (2)$$

(in the formula, $P^3$ represents independently an acrylate group or a methacrylate group, $E^3$ represents an alkylene group having the carbon atom number of 1 to 15, at least one methylene group present in the alkylene group may be substituted with an oxygen atom, —CO—, —OCO—, —COO—, or —CH=CH—, where oxygen atoms are not directly bonded to each other, $A^4$, $A^5$, and $A^6$ represent independently a 1,4-phenylene group or a 2,6-naphthylene group, the 1,4-phenylene group or the 2,6-naphthylene group may be unsubstituted or have at least one fluorine atom, chlorine atom, or alkyl group having the carbon atom number of 1 to 3 (at least one methylene group in the alkyl group may be substituted with an oxygen atom, —CO—, —OCO—, or —COO—, where oxygen atoms are not directly bonded to each other) as a substituent, at least one of $A^4$, $A^5$, and $A^6$ has a substituent, $Z^3$ and $Z^4$ represent independently —COO—, —OCO—, —CH$_2$CH$_2$—, or a single bond, $R^1$ represents a hydrogen atom, a fluorine atom, a chlorine atom, a cyano group, or an alkyl group having the carbon atom number of 1 to 15, and at least one methylene group present in the alkyl group may be substituted with an oxygen atom, —CO—, —OCO—, —COO—, or —CH=CH—, where oxygen atoms are not directly bonded to each other).

2. The polymerizable liquid crystal composition according to claim 1, comprising at least one type of polymerization initiator as a third component and a surfactant or a compound including a repeating unit represented by General formula (3) and having a weight average molecular weight of 100 or more as a fourth component, $$\text{-}(\text{CR}^{11}\text{R}^{12}\text{—CR}^{13}\text{R}^{14})\text{-} \quad (3)$$

(in the formula, $R^{11}$, $R^{12}$, $R^{13}$, and $R^{14}$ represent independently a hydrogen atom, a halogen atom, or a hydrocarbon group having the carbon atom number of 1 to 20, and hydrogen atoms in the hydrocarbon group may be substituted with at least one halogen atom).

3. The polymerizable liquid crystal composition according to claim 2, comprising a chiral compound as a fifth component.

4. The polymerizable liquid crystal composition according to claim 1, comprising a thiol compound as an additional component.

5. The polymerizable liquid crystal composition according to claim 1, wherein the first component is represented by General formula (1-1),

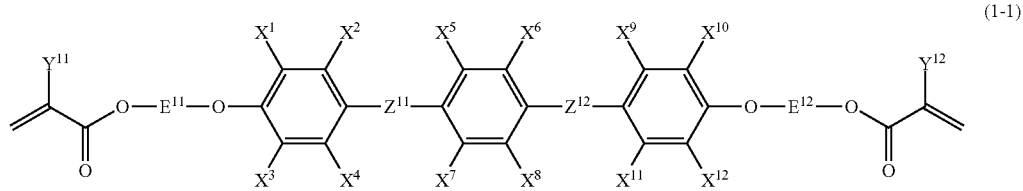

(1-1)

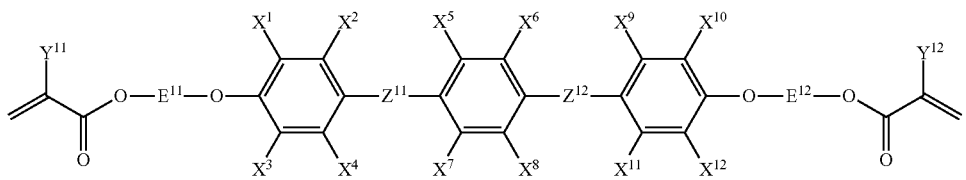
(1-1)

(in the formula, $Y^{11}$ and $Y^{12}$ represent independently a hydrogen atom or a methyl group, $E^{11}$ and $E^{12}$ represent independently an alkylene group having the carbon atom number of 1 to 13, at least one methylene group present in the alkylene group may be substituted with an oxygen atom, —CO—, —OCO—, —COO—, or —CH=CH—, where oxygen atoms are not directly bonded to each other, $X^1$ to $X^{12}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, and $Z^{11}$ and $Z^{12}$ represent independently —COO—, —OCO—, or a single bond).

6. The polymerizable liquid crystal composition according to claim 1, wherein the second component includes at least one type of compound, in which $A^4$, $A^5$, and $A^6$ in General formula (2) are 1,4-phenylene groups, the 1,4-phenylene groups may independently be unsubstituted or have at least one fluorine atom, chlorine atom, methyl group, methoxy group, $CF_3$ group, or $OCF_3$ group as a substituent, and at least one of $A^4$, $A^5$, and $A^6$ has at least one substituent, and at least two types of compound, in which at least one of $A^4$, $A^5$, and $A^6$ in General formula (2) is a 2,6-naphthylene group and the other two are 1,4-phenylene groups, the 2,6-naphthylene group and the 1,4-phenylene groups may independently be unsubstituted or have at least one fluorine atom, chlorine atom, methyl group, methoxy group, $CF_3$ group, or $OCF_3$ group as a substituent, and at least one of $A^4$, $A^5$, and $A^6$ has at least one substituent.

7. The polymerizable liquid crystal composition according to claim 1, wherein the second component includes at least one type of compound represented by General formula (2-1) and at least two types of compound selected from the group consisting of General formulae (2-2) to (2-4),

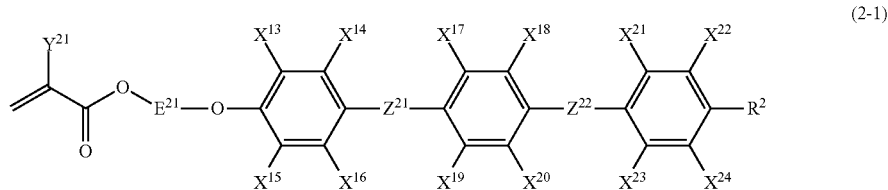
(2-1)

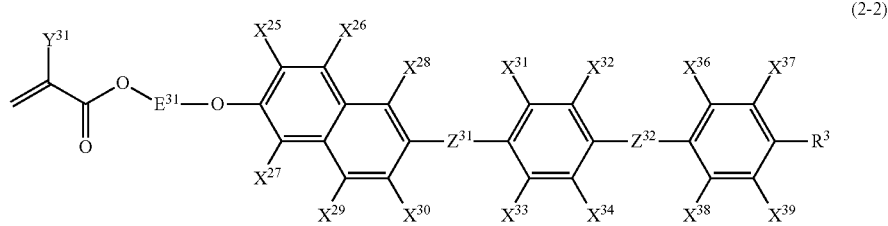
(2-2)

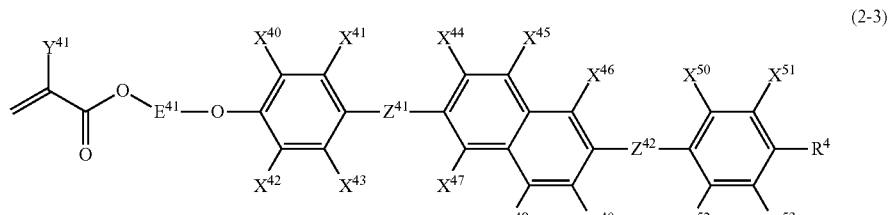
(2-3)

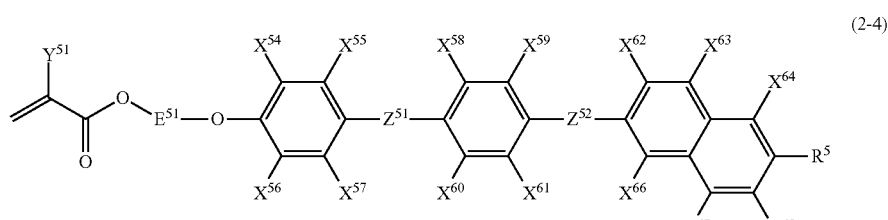
(2-4)

(2-4)

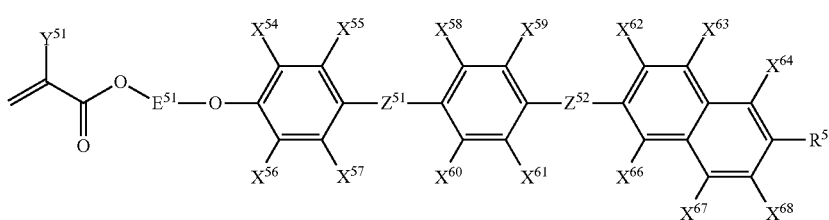

(in the formulae, $Y^{21}$, $Y^{31}$, $Y^{41}$, and $Y^{51}$ represent independently a hydrogen atom or a methyl group, $E^{21}$, $E^{31}$, $E^{41}$, and $E^{51}$ represent independently an alkylene group having the carbon atom number of 1 to 13, at least one methylene group present in the alkylene group may be substituted with an oxygen atom, —CO—, —OCO—, —COO—, or —CH=CH—, where oxygen atoms are not directly bonded to each other, $Z^{21}$, $Z^{22}$, $Z^{31}$, $Z^{32}$, $Z^{41}$, $Z^{42}$, $Z^{51}$, and $Z^{52}$ represent independently —COO—, —OCO—, or a single bond, $X^{13}$ to $X^{24}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, $X^{25}$ to $X^{39}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, $X^{40}$ to $X^{53}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, $X^{54}$ to $X^{68}$ represent independently a hydrogen atom, a fluorine atom, a chlorine atom, a methyl group, a methoxy group, a $CF_3$ group, or an $OCF_3$ group, one or more and three or less of them are a fluorine atom, a chlorine atom, a methyl group, a methoxy group, a $CF_3$ group, or an $OCF_3$ group, and $R^2$ to $R^5$ represent independently a hydrogen atom, a fluorine atom, a chlorine atom, a cyano group, or an alkyl group having the carbon atom number of 1 to 15, and at least one methylene group present in the alkyl group may be substituted with an oxygen atom, —CO—, —OCO—, —COO—, or —CH=CH—, where oxygen atoms are not directly bonded to each other).

8. A thin film produced by polymerizing the polymerizable liquid crystal composition according to claim 1.

* * * * *